A. HEARST & W. W. DUNN
Corn-Planter.

No. 210,531. Patented Dec. 3, 1878.

Witnesses:
H. H. Bruns.
O. W. Bond.

Inventors:
Wm H Dunn
Alexr Hearst
By West & Bond Attys

UNITED STATES PATENT OFFICE.

ALEXANDER HEARST AND WILLIAM W. DUNN, OF PEORIA, ILLINOIS.

IMPROVEMENT IN CORN-PLANTERS.

Specification forming part of Letters Patent No. 210,531, dated December 3, 1878; application filed October 19, 1878.

*To all whom it may concern:*

Be it known that we, ALEXANDER HEARST and WILLIAM W. DUNN, of Peoria, Peoria county, State of Illinois, have invented a new and useful Improvement in Corn-Planters, of which the following is a full description, reference being had to the accompanying drawings, in which—

Figure 1:
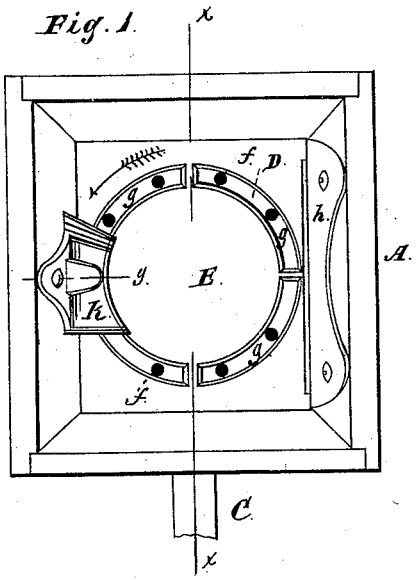
Figure 4:
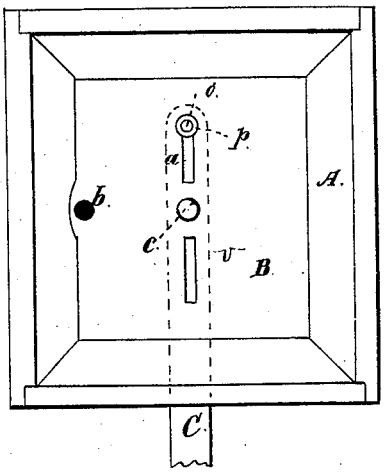
Figure 2:
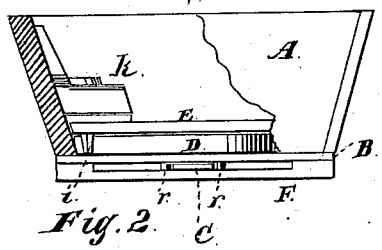
Figure 5:
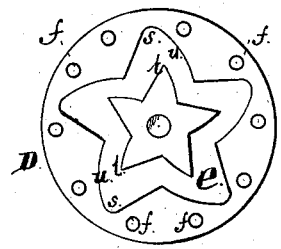
Figure 10:
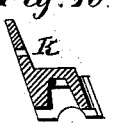
Figures 8, 9:
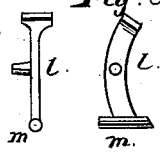
Figure 6:
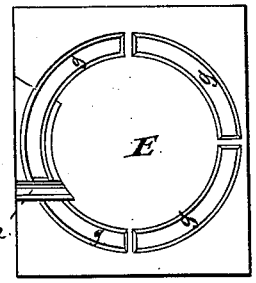
Figure 7:
Figure 3:
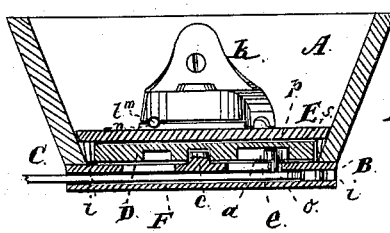

Figure 1 is a plan showing one seed-box and the parts therein. Fig. 2 is an elevation with a portion of the seed-box cut away; Fig. 3, a vertical section at $x$ of Fig. 1. Fig. 4 is a plan looking into the seed-box after the rotary plate and parts above it have been removed. Fig. 5 is an under-side view of the rotary plate. Fig. 6 is a plan of the plate beneath which the rotary plate is located, and Fig. 7 is a side elevation of the same plate. Fig. 8 is a top view, and Fig. 9 a side view, of the cut-off. Fig. 10 is a section of the part represented, taken at $y$ of Fig. 1.

Our invention relates to that class of planters in which a rotary seed-plate is used; and it consists in providing the rotary seed-slide with a groove on the under side somewhat star-shaped in form, and in providing a reciprocating bar having a stud or pin on one end, for the purpose of rotating the seed-slide and holding the same in position without the use of an independent stop, as more fully hereinafter set forth, and in a variation hereinafter described.

In the drawings, A represents a seed-box, two of which may be used, as usual. B is a plate secured to the bottom of the seed-box. In this plate is a slot, $a$, and a hole, $b$, through which the seed passes. $c$ is a stud secured to this plate B, on which the rotary seed-plate pivots.

D is a rotary seed-plate pivoted on the stud $c$. In its under side is a groove, $e$, somewhat star-shaped. It is provided with a series of holes, $f$, which, when this plate D is in position, form seed-cups. They are in a circle and equidistant from each other.

E is another plate fitting within the walls of the seed-box A. It is above, but does not rest upon, the plate D. As shown, it stands upon the plate B, supported on four short legs, $i$, one at each corner. It is provided with openings $g$ concentric with the seed-cups in D, to permit the seed to pass into the seed-cups $f$. It may be secured in the seed-box in any suitable manner. As shown, this is done by means of a ledge or projecting plate, $h$, on one side of A, under which one edge of E passes, and by the piece $k$, which is secured to the opposite side of the seed-box.

$l$ is a cut-off. It is located over one of the openings $g$ in the plate E, over the hole $b$ in B, and beneath the piece $k$. One end, $m$, of the cut-off rests in a recess, $n$, in B, and is so held by the cap or piece $k$ that the opposite end of the cut-off can rise and fall in the usual manner, the under side of $k$ being cut away, as shown in Fig. 10.

C is a straight bar having a reciprocating movement. It is located beneath the plate B. On the outer end is a stud, $o$, which projects upward, passes through the slot $a$ in B, and into the groove $e$ in the under side of D. This bar C rests and moves on the plate F, between which and B there is sufficient space for C, which passes between two pins, $r\ r$, at the edge of the seed-box, which serve as guides. On the stud $o$ is a friction-roller, $p$, which is desirable, but not a necessity.

The plate B is thickened where the cut-off is located, the addition being on the upper side, and the walls which receive the cut-off are beveled on the inside, forming a seat for the cut-off.

In the plate F there is a hole, (not shown in the drawings,) located under the hole $b$ in B, through which the seed falls. In manufacturing, these two holes may be connected by a short tube.

We have shown ten holes or seed-cups in D, and the groove $e$ is so arranged that with each half-movement of the bar C one of these holes $f$ is brought over the discharge-opening $b$ in B.

The operation of our improvement is as follows: Suppose the bar C to be in the position shown in Fig. 4, the pin $o$ will then be at one of the points $s$ of the groove $e$. If then the shake-bar C be moved, bringing the stud to the other end of the slot $a$, the stud $o$ or roller $p$ will come in contact with one of the parts of the inner wall of the groove $e$ at $t$, and its action on this part of the wall of the groove will cause the plate D to move on the pivot $c$, making one-tenth of a full revolution and carrying the seed-cup next to the cap $k$, under the cut-off, and over $b$. When the bar C is moved in the opposite direction the stud or roller will come in contact with a curved portion, $u$, of the outer wall of the groove $e$, and its action will cause the plate D to move again, bringing another seed-cup $f$ under the cut-off and over $b$. The plate D will move only in one direction, which is indicated by the arrow in Fig. 1. The stud $o$ also serves the purpose of a stop, and arrests the movement of the plate D whenever the shake-bar C has reached the limit of its movement in either direction, and holds D in the proper position for the discharge of the seed. The action of these parts is positive, and no springs are required, and no separate device is used as a stop. During the passage of the seed-plate the cups will be well filled with seed. The cut-off operates in the usual manner.

The number of holes or seed-cups in D may be varied, the groove $e$ being correspondingly changed. We think that the number of seed-cups shown and the groove as shown are best adapted to corn-planting.

The groove $e$ is zigzag in form, but the two walls are not alike. We have ascertained by trial that the best results are produced by giving to the groove substantially the form represented, which will be understood by reference to the drawing. The shake-bar C is to be operated in the usual manner.

We have shown and described a zigzag groove, $e$, bounded on both sides by walls somewhat star-like in form, and a shake-bar having one stud or pin, $o$. It is evident that the same result can be accomplished by omitting the inner wall of the groove and using a second stud on the shake-bar, located on the opposite side of the pin $c$, which second stud will work in a slot, $v$, in B, corresponding with $a$, the second stud being designed to act the same as $o$ on the outer wall and on the side opposite to that on which $o$ acts. This second stud by its action accomplishes the same result reached by the action of the stud $o$ on the inner wall of the groove. So, again, the outer wall of the groove might be omitted, the second stud being used, in which case both studs would act on the inner wall, each half-motion of the bar C causing the plate D to move. Hence, we do not limit ourselves to a complete zigzag groove bounded by two walls and a single pin acting on both walls, but include in our invention a single zigzag wall and two studs acting alternately on opposite sides thereof, as above set forth.

What we claim as new, and desire to secure by Letters Patent, is as follows:

The rotary seed-plate D, provided with a groove or a projection somewhat star-shaped in form, as described, in combination with a reciprocating shake-bar, C, provided with one or more studs, and the plate B, provided with one or more slots, substantially as and for the purpose set forth.

ALEXANDER HEARST.
WM. W. DUNN.

Witnesses:
HENRY A. BUSH,
E. R. MANN.